United States Patent
Den Breejen et al.

(10) Patent No.: US 10,955,607 B2
(45) Date of Patent: Mar. 23, 2021

(54) LED LIGHTING DEVICE WITH REMOTE PHOSPHOR IN-COUPLING STRUCTURE FOR IN-COUPLING LIGHT FROM LIGHT EMITTING DIODES

(71) Applicant: Lumileds LLC, San Jose, CA (US)

(72) Inventors: Jeroen Den Breejen, Morgan Hill, CA (US); Gregory Donald Guth, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 15/912,496

(22) Filed: Mar. 5, 2018

(65) Prior Publication Data

US 2018/0259702 A1 Sep. 13, 2018

Related U.S. Application Data

(60) Provisional application No. 62/468,096, filed on Mar. 7, 2017.

(51) Int. Cl.
*F21V 8/00* (2006.01)
*H05B 45/20* (2020.01)
*G02F 1/13357* (2006.01)

(52) U.S. Cl.
CPC ......... *G02B 6/0073* (2013.01); *G02B 6/0016* (2013.01); *G02B 6/0023* (2013.01); *G02B 6/0031* (2013.01); *G02B 6/0055* (2013.01); *G02B 6/0091* (2013.01);
(Continued)

(58) Field of Classification Search
CPC ..... F21V 9/08; F21V 9/30; F21V 9/32; G02B 5/08; G02B 6/0023; G02B 6/0026; G02B 6/0086; G02B 6/0088; G02B 6/0091; G02B 6/0055; G02B 6/0021; G02B 6/0028; G02B 6/0031; G02B 6/0011; G02B 6/0053;
(Continued)

(56) References Cited

U.S. PATENT DOCUMENTS 6,480,247 B1 * 11/2002 Moon ............... G02F 1/133621 349/106
6,584,714 B1   7/2003 Wehrmann et al.
(Continued)

FOREIGN PATENT DOCUMENTS

WO   2006/137660   12/2006
WO   2012/168659   12/2012

OTHER PUBLICATIONS

"Genestar_kuraray.pdf", accessed at https://www.kuraray.com/products/genestar on Sep. 30, 2019 (Year: 2019).*
(Continued)

*Primary Examiner* — Erin Kryukova

(57) ABSTRACT

A lighting device and method of forming the lighting device are provided. The lighting device includes a light guide, a lighting element having a light emitting diode (LED), and an in-coupling structure. The in-coupling structure includes one or more remote phosphor regions and one or more reflective regions. The in-coupling structure is integrally formed in a single piece. The in-coupling structure is affixed to the light guide and the lighting element, and is positioned between the light guide and the LED. An optional seal may be a part of the integrally formed in-coupling structure.

18 Claims, 6 Drawing Sheets

(52) U.S. Cl.
CPC ...... *G02F 1/133615* (2013.01); *G02B 6/0021* (2013.01); *H05B 45/20* (2020.01)

(58) Field of Classification Search
CPC ................ G02B 6/0016; G02B 6/0073; G02F 1/133615; G02F 2001/13361; G02F 2001/155614
See application file for complete search history.

(56) References Cited

U.S. PATENT DOCUMENTS

| | | | | |
|---|---|---|---|---|
| 6,637,905 B1* | 10/2003 | Ng | ...................... | G02B 6/0026 362/601 |
| 8,570,270 B2* | 10/2013 | You | ...................... | G02B 6/0061 345/102 |
| 9,001,288 B2* | 4/2015 | Tsukahara | ............ | G02B 6/0023 349/69 |
| 9,341,346 B1* | 5/2016 | Wright | .................... | F21V 17/10 |
| 10,088,618 B2* | 10/2018 | Stormberg | ........... | G02B 6/0025 |
| 10,168,469 B2* | 1/2019 | Teragawa | ........... | G02B 6/0055 |
| 10,359,176 B2* | 7/2019 | Cha | .......................... | F21V 9/30 |
| 2006/0001037 A1* | 1/2006 | Schardt | ............... | G02B 6/0008 257/98 |
| 2006/0002141 A1* | 1/2006 | Ouderkirk | ........... | G02B 6/0001 362/609 |
| 2009/0168395 A1* | 7/2009 | Mrakovich | ............ | F21S 8/032 362/84 |
| 2010/0187975 A1* | 7/2010 | Tsukahara | ........... | G02B 6/0038 313/503 |
| 2010/0238381 A1* | 9/2010 | Oshima | ............ | G02F 1/133603 349/71 |
| 2011/0181809 A1* | 7/2011 | Sekiguchi | ......... | G02F 1/133615 349/62 |
| 2011/0182085 A1* | 7/2011 | Ko | ........................... | F21K 9/00 362/612 |
| 2013/0114020 A1* | 5/2013 | Cho | .................. | G02F 1/133615 349/62 |
| 2014/0118661 A1* | 5/2014 | Qi | ..................... | G02F 1/133605 349/62 |
| 2014/0286049 A1* | 9/2014 | Cha | ................... | G02F 1/133615 362/609 |
| 2015/0205031 A1* | 7/2015 | Van Herpen | ........ | G02B 6/0023 362/608 |
| 2015/0219821 A1 | 8/2015 | Seo et al. | | |
| 2015/0219822 A1* | 8/2015 | Lee | ..................... | G02B 6/0023 362/608 |
| 2015/0226904 A1* | 8/2015 | Bae | ..................... | G02B 6/0023 362/608 |
| 2015/0247965 A1* | 9/2015 | Song | ................... | G02B 6/0073 362/606 |
| 2015/0338064 A1* | 11/2015 | Ishino | ............... | G02F 1/133615 349/61 |
| 2015/0355400 A1* | 12/2015 | Li | ..................... | G02F 1/133608 349/62 |
| 2016/0062023 A1 | 3/2016 | Itoh et al. | | |
| 2016/0209572 A1 | 7/2016 | Cho et al. | | |
| 2016/0322543 A1* | 11/2016 | Jeon | ..................... | H01L 33/505 |
| 2016/0341874 A1* | 11/2016 | Fan | ..................... | G02B 6/0091 |
| 2017/0205047 A1* | 7/2017 | Cha | ..................... | F21K 9/64 |
| 2017/0219759 A1* | 8/2017 | Oh | ....................... | G02B 6/0026 |

OTHER PUBLICATIONS

International Search Report corresponding to PCT/US2018/021142 dated Jun. 26, 2018, 4 pages.
From the EPO as the ISA, "Written Opinion of the International Searching Authority", corresponding to PCT/US2018/021142 dated Jun. 26, 2018, 5 pages.

* cited by examiner

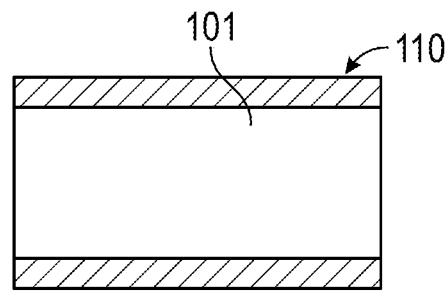
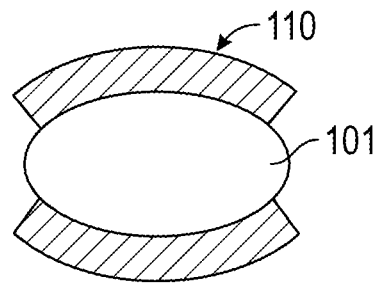
FIG. 3A   FIG. 3B
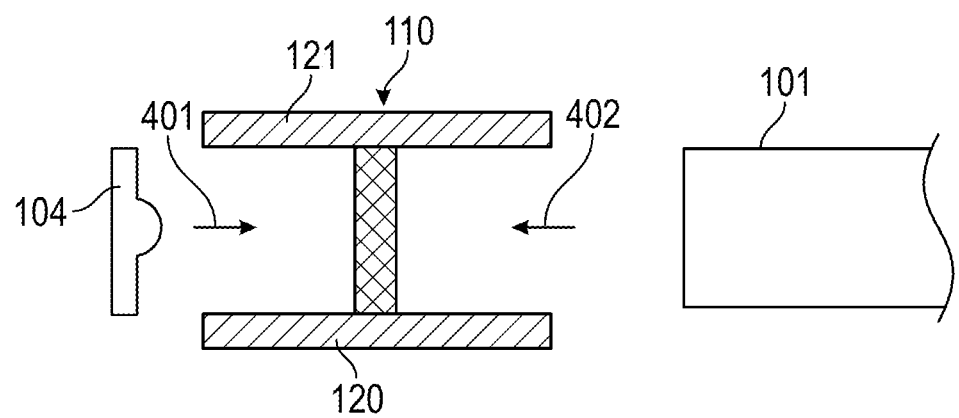
FIG. 4
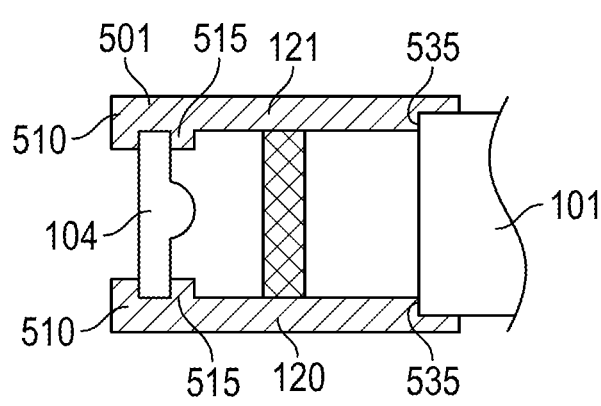
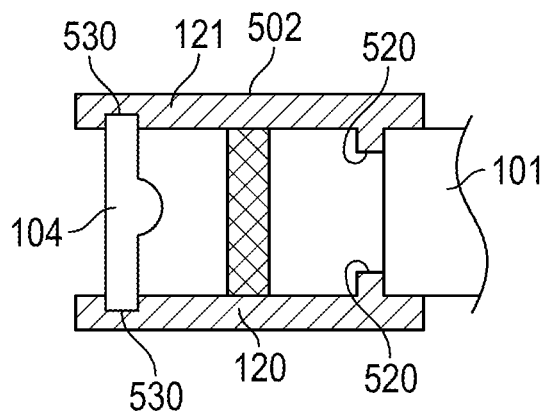
FIG. 5A   FIG. 5B

LED LIGHTING DEVICE WITH REMOTE PHOSPHOR IN-COUPLING STRUCTURE FOR IN-COUPLING LIGHT FROM LIGHT EMITTING DIODES

CROSS REFERENCE TO RELATED APPLICATIONS

This application claims the benefit of U.S. Provisional Application No. 62/468,096 filed on Mar. 7, 2017, the contents of which are incorporated by reference as if fully set forth.

BACKGROUND

Semiconductor light sources, such as light emitting diodes ("LEDs"), are commonly used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications, such as outdoor lighting, decorative lighting, or outdoor lighting.

Light guide plates ("LGPs") may be used in LED lighting applications. A LGP may be composed of a transparent material, such as acrylic, and may receive light generated from one or more LEDs of a light source. The LGP may diffuse the light through an entire surface thereof.

SUMMARY

The following description includes a lighting device and methods of forming the same. The lighting device may include a light guide plate (LGP), a lighting element comprising a mount and a light emitting diode (LED), and an in-coupling structure joining the LGP and the lighting element. An upper reflective region of the in-coupling structure may be on an upper surface of the lighting element and an upper surface of the LGP. A lower reflective region of the in-coupling structure may be on a lower surface of the lighting element and a lower surface of the LGP. A remote phosphor region joining the upper reflective region and the lower reflective region may be between the lighting element and the LGP and may be separated by the lighting element by a first cavity.

BRIEF DESCRIPTION OF THE DRAWINGS

A more detailed understanding may be had from the following description, given by way of example in conjunction with the accompanying drawings wherein:

FIGS. 3A-3B are cross-sectional views of the lighting device;
FIG. 4 is a cross-sectional view of components of the lighting device and a method for assembly;
FIGS. 5A-5B are cross-sectional views of in-coupling structures that include optional alignment features for assisting in assembly and alignment with a lighting element and a light guide plate (LGP)

DETAILED DESCRIPTION

Figure 1:
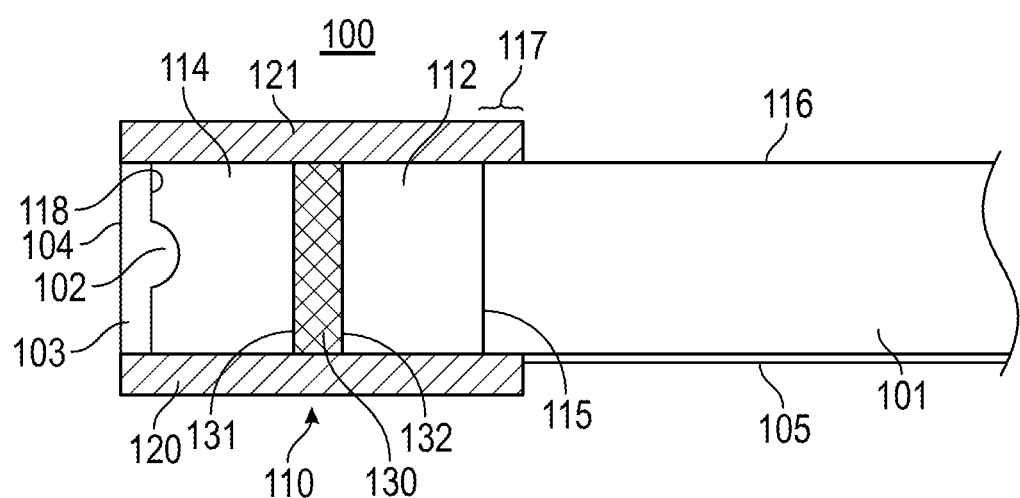
FIG. 1 is a cross-sectional view of a lighting device.

Examples of different light emitting diode ("LED") implementations will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

In conventional applications, a white LED may be used to couple emitted light into a light guide plate ("LGP"). The LGP may propagate the light from an in-coupling portion, which may be bounded by one or more reflectors, towards an out-coupling portion that allows the light to diffuse through. Conventional in-coupling techniques require a set of individual components, including the LED die, the LGP, a top reflector, a bottom reflector, and an optional seal. The top reflector and the bottom reflector may create a higher in-coupling efficiency by reflecting the light that does not hit the in-coupling surface of the LGP. The reflect light may have another chance for in-coupling rather than being lost.

In most cases, the white LEDs may include a die that emits a blue light and a phosphor layer that converts the blue light into white light. This is known in the art as the "phosphor conversion." In conventional applications, the phosphor conversion may occur on the surface of the LED die. This may result in heat generation within the device, which may ultimately lower the efficiency of the phosphor conversion. In addition, because the LED die and phosphor layer are one unit, applications that require correlated color temperature ("CCT") and/or color rendering index ("CRI") tuning may require a number of different individual dies to achieve a desired result.

A remote phosphor solution, in which the phosphor layer is separated from the LED die, may be used in the in-coupling portion. Because the phosphor layer is not directly on the LED die, heat generation within the device may be minimized and efficiency of phosphor conversion may be increased. In addition, the same LED die may be used to achieve CCT/CRI by only varying the composition and/or measurements of the phosphor layer. However, the separate phosphor layer in the remote phosphor solution may increase the number of components required and overall complexity for the in-coupling portion.

Accordingly, it may be desirable to combine the remote phosphor layer, the top reflector, and the bottom reflector into one in-coupling structure that can fit the LED die and LGP in order to reduce the complexity of the in-coupling portion and provide the flexibility of the remote phosphor solution. The in-coupling structure may be easier to assemble, more efficient to drive, have a better phosphor conversion factor, have a more efficient and uniform in-coupling mechanism, resulting in a smaller bezel length and frame.

Referring now to FIG. 1, a cross-sectional view of a lighting device 100 is shown. The lighting device 100 may include a LGP 101 coupled to a lighting element 104 by an in-coupling structure 110. The lighting element 104 may include a LED 102 that is connected to a mount 103. The LED 102 may include a LED die directly mounted on the mount 103. Although not shown, the LED 102 may also include a small submount between the LED die and the mount. The mount 103 may provide electrical connection to the LED 102. The mount 103 may be, for example, a rigid printed circuit board (PCB) or a flexible tape. Although not shown, the mount 103 may connect one or more strings of LEDs in series and/or parallel.

The in-coupling structure 110 may be positioned between the lighting element 104 and the LGP 101. The in-coupling structure 110 may physically connect the lighting element 104 to the light guide 101. The in-coupling structure 110 may in-couple light emitted from the LED 102 into the LGP 101. In addition, the in-coupling structure 110 may prevent light from being wasted through leakage by using light recycling techniques. This may be achieved by using reflective regions to optimize the in-coupling efficiency.

The in-coupling structure 110 may include a lower reflective region 120 spaced apart from an upper reflective region 121. The lower reflective region 120 may be substantially parallel to the upper reflective region 121. The in-coupling structure 110 may include a phosphor region 130 connecting the lower reflective region 120 and the upper reflective region 121. The phosphor region 130 may be perpendicular to lower reflective region 120 and the upper reflective region 121. The phosphor region 130 may be positioned between the lower reflective region 120 and the upper reflective region 121 such that a section of each of lower reflective region 120 and the upper reflective region 121 extends beyond the edges of the phosphor region 130. The lower reflective region 120, the upper reflective region 121, and the phosphor region 130 may be integrally formed so that the in-coupling structure 110 is a single piece.

The lighting element 104 may be positioned between or adjacent to an end of the lower reflective region 120 and an end of the upper reflective region 121. The mount 103 may include reflective material on its upper surface 118 to reflect light emitted by the LED 102 towards the phosphor region 130, the lower reflective region 120, and the upper reflective region 121. The mount 103 may include a heatsink function on its lower surface opposite to surface 118. The heatsink function may conduct and transfer the heat generated by the LED 102. The lighting element 104 may be attached to the in-coupling structure 110 using alignment elements that may be formed as part of the in-coupling structure 110. The alignment elements are described in more detail below with respect to FIGS. 6A and 6B.

The LED 102 may be located within a first cavity 114 of the lighting device 100. The first cavity 114 is enclosed by the lighting element 104 in-coupling structure 110. The first cavity 114 is formed by the top surface 118 of the mount 103, the LED 102, an inner side of the lower reflective region 120, an inner side of the upper reflective region, and a first side 131 of the phosphor region 130. The LED 102 faces the first side 131 of the phosphor region 130 and may be separated from it by a space.

The lighting device 100 may have a second cavity 112 located on an opposite side of the phosphor region 131. The in-coupling structure 110 is positioned such that the second cavity 112 is bounded by a light in-coupling edge 115 of the LGP 101, the inner side of the lower reflective region 120, the inner side of the upper reflective region, and a second side 132 of the phosphor region 130. The light in-coupling edge 115 of the LGP 101 may face the second side 132 of the phosphor region 130, and may be spaced apart from the second side 132 of the phosphor region 130 to create the second cavity 112. The second cavity 112 may have any air gap distance between the phosphor region 130 and the light in-coupling edge 115. The air gap may be miniscule but still effective in coupling the light emitted from the LED 102 and passing through the phosphor region 130. In one example, the light in-coupling edge 115 of LGP 101 may actually contact the phosphor region 130.

The LGP 101 may be rectangular, circular, or have another cross-sectional shape. The LGP 101 may be made of a transparent material such as polycarbonate (PC), poly (methyl methacrylate) (PMMA), polyethylene (PE), or another type of acrylic and/or plastic. The LGP 101 may be rigid or flexible. The LGP 101 may include various features, such as light extraction features (e.g., roughening, prisms, ink dots, etc.) that are known in the art. The LGP 101 may also include, for example, a bottom reflecting sheet 105 to reflect light towards an out-coupling surface 116 to out-couple the light through throughout the length of the LGP 101. The LGP 101 may be used as a backlight in any size and type of device, such as a smartphone, a tablet, a TV, or may be used in illumination applications such as troffers, downlights, high bays, and linear lighting structures.

The in-coupling structure 110 may in-couple light emitted from the LED 102 into the LGP 101. Light may be emitted from the LED 102 into the first cavity 114. A portion of the light emitted from the LED 102 may directly enter the first side 131 of phosphor region 130 through the first cavity 114. The light may be wavelength converted by the phosphor in the phosphor region 130 before exiting through the second side 132 and entering second cavity 112. Another portion of the light emitted from LED 102 may first reflect off of the inner side of the lower reflective region 120 and/or the inner side of the upper reflective region 121 in the first cavity 114 and then enter the first side 131 of phosphor region 130. The light may be wavelength converted by the phosphor in the phosphor region 130 before exiting through the second side 132 and entering second cavity 112. The lower reflective region 120 and the upper reflective region 121 may prevent light from leaking out of the first cavity 114 before entering the first side 131 of the phosphor region 130.

Wavelength converted light may exit the phosphor region 130 at the second side 132, and may be in-coupled to the LGP 101 after traveling through the second cavity 112. The inner side of the lower reflective region 120 and the inner side of the upper reflective region 121 may prevent light leakage from the second cavity 112. The LGP 101 may propagate the light from the second cavity 112 toward the out-coupling surface 116.

The LED 102 may be any color, temperature, or intensity LED. The phosphor region 130 may be any composition that wavelength converts the light emanated from the LED 102 to transform one or more of color, hue, temperature, luminosity, and wavelength characteristics of the emanated light. In an example, the LED 102 may be a blue LED and the phosphor material used in phosphor region 130 may be a yellow phosphor, such as yttrium aluminum garnet (YAG). In other example, the LED 102 may be a blue LED and the phosphor material used in phosphor region 130 may be a red phosphor. In another example, the LED 102 may be a blue LED and the phosphor material used in the phosphor region 130 may up-convert the blue light to red light for horticultural use. Light emitted from the LED 102 into the first cavity 114 may be converted to another wavelength by the phosphor region 130. The light may enter the second cavity 112 and may be in-coupled into the LGP 101.

Although not shown in FIG. 1, multiple LEDs 102 may be on to the mount 103. The light emitted from each LED 102 of the multiple LEDs 102 may mix in first cavity 114 before entering the phosphor region 130 of the in-coupling structure 110. As a result, uniform light may enter the second cavity 112 and may be in-coupled into the LGP 101.

In contrast, in a lighting device in which the phosphor is positioned separately in front of each individual LED, the light in-coupled into the light guide is typically not uniform in the edge region of the light guide. The light may mix within the edge of the light guide to become uniform. Thus, a bezel length (i.e., the amount of the light guide covered by reflective material at the edge of the light guide) is conventionally made large enough to cover the non-uniform edge region to achieve a uniform light emission from the light guide.

However, in the lighting device 100, the light in-coupled into the LGP 101 may be more uniform when it enters the LGP 101 and the required bezel length 117 may be reduced. In addition, because of the light emitted from the multiple LEDs 102 may mix in second cavity 114, fewer LEDs 102 may be needed to achieve the same amount of uniformity as compared to multiple individual white LEDs in which the phosphor material is positioned only in front of each LED.

Additionally, when the in-coupling structure 110 is made from a material that is capable of absorbing, conducting, and/or emitting heat generated by the LED 102 (e.g., silicone), heat dissipation can be achieved using less space, and the bezel length may be reduced. Furthermore, because the phosphor conversion may occur in the phosphor region 130 at a removed distance from the LED 102, the lighting device 100, and particularly the area around the LED 102 may be cooler. This may increase the efficiency of the lighting device 100.

Figure 2:
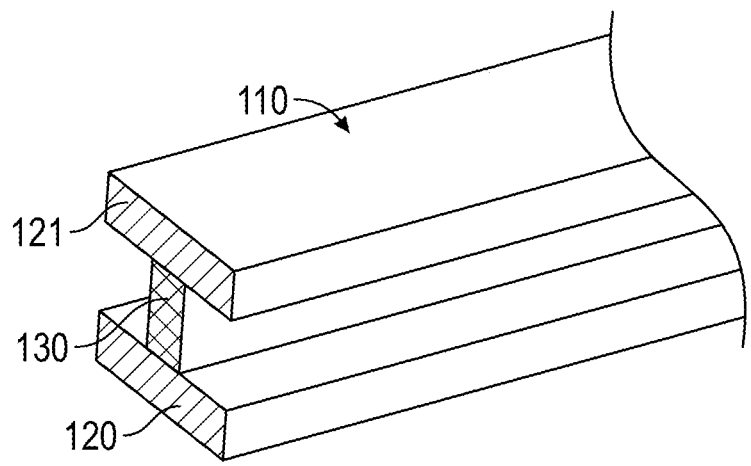
FIG. 2 is a perspective view of an in-coupling structure.

Referring now to FIG. 2, a perspective view of the in-coupling structure 110 is shown. A described above, the phosphor region 130 may be positioned between the lower reflective region 120 and the upper reflective region 121 such that sections of each of the reflective regions extend beyond the edges of the phosphor region 130 to form an approximately H-shaped structure in cross-section. The sections of the lower reflective region 120 and the upper reflective region 121 may improve the in-coupling efficiency by preventing any light waste or leakage around the lighting element 104 inserted into one of the side openings of the H-shaped structure and around the in-coupling edges of the LGP 101 inserted into another one of the side openings of the H-shaped structure. Although illustrated in FIG. 2 as having an H-shape, the lower reflective region 120 and the upper reflective region 121 may not be parallel to each other. The lower reflective region 120 and the upper reflective region 121 may have any number of different shapes. For example, the lower reflective region 120 and the upper reflective region 121 may form an angled or triangular shape. The resulting in-coupling structure 110 may have more of an A-shape. In another example, or one or both of the lower reflective region 120 and the upper reflective region 121 may be curved.

The in-coupling structure 110 may be made of a transparent material such as silicone, PC, PMMA, PE, or another type of acrylic and/or plastic. The in-coupling structure 110 may be rigid or flexible. The in-coupling structure 110 may be formed by any method used to form solid structures in plastics, such as extrusion methods, injection molding methods, or compression molding methods. The phosphor region 130 may be formed by any method use to incorporate materials into plastic. In an example, phosphor powder may be injected into softened silicone during extrusion or molding to form the phosphor region 130. The phosphor region 130 may have a uniform composition, or may have a varied composition of phosphor along its length. In an example in which the more than one LED 102 is used, the composition of the phosphor region 130 may vary between one or more LEDs 102. In an example, the phosphor region 130 may include portions having little to no phosphor to allow for transparent windows. The transparent windows may allow light emitted from the one or more LEDs to pass through without undergoing a wavelength conversion.

Similarly, white or reflective powder, such as $TiO_2$, may be injected into the softened silicone to form the lower reflective region 120 and the upper reflective region 121. In another example, different silicone mixtures containing the phosphor and/or the reflective material for the phosphor region 130, the lower reflective region 120, and the upper reflective region 121 may be combined during an extrusion or molding process. In another example, the phosphor and/or the reflective material may be coated onto the surface of the phosphor region 130, the lower reflective region 120, and the upper reflective region 121 after the structure is formed of the transparent base material. This may be done, for instance, by spray coating using a mask or by a lamination process.

Referring now to FIGS. 3A and 3B, cross-sectional views of the lighting device 100 are shown. FIGS. 3A and 3B show a perspective looking down the LGP 101 towards the a first end of the LGP 101 mounted in-coupling structure 110. In FIG. 3A, the LGP 101 is shown as a quadrilateral structure. The in-coupling structure 110 may surround a portion of the LGP 101 on two sides. It should be noted that the LGP 101 may be any shape having straight sides. In FIG. 3B, the LGP 101 is shown as a curved structure with non-linear sides. The in-coupling structure 110 may surround a portion of the LGP 101. It should be noted that the LGP 101 may have a second end mounted to another in-coupling structure 110.

Referring now to FIG. 4, a cross-sectional view of components of the lighting device 100 and a method for assembly is shown. To assemble the lighting device 100, the lighting element 104, the LGP 101, and the in-coupling structure 110 may be pre-formed before assembly of the lighting device 100. The lighting element 104 may joined to the in-coupling structure 110 by being slid or inserted 401 into the area between the lower reflect region 120 and the upper reflective region 121. Alternatively, the in-coupling structure 110 may be slid or inserted 402 onto the lighting element 104. The friction between the lighting element 104 and the in-coupling structure 110 may be sufficient to hold the two parts together. The LGP 101 may be joined to the in-coupling structure 110 by being slid or inserted 402 into the area between the lower reflect region 120 and the upper reflective region 121. Alternatively, the in-coupling structure 110 may be slid or inserted 402 onto the LGP 101. The friction between the LGP 101 and the in-coupling structure 110 may be sufficient to hold the two parts together.

Because of the ease of assembly, making lighting devices 100 that have different color rendering indices and/or correlated color temperatures is relatively easy. The same blue LEDs may be used for all lighting devices 100, and different edge in-coupling structures prepared with different phosphors in phosphor region 130 may be used to easily change the color temperature of the light emitted from the lighting device 100.

Referring now to FIGS. 5A and 5B, cross-sectional views of in-coupling structures that include optional alignment features for assisting in assembly and alignment with the lighting element 104 and the LGP 101. FIG. 5A illustrates an in-coupling structure 501 that is similar to the in-coupling structure 110, but may have first raised lighting element holders 510 and second raised lighting element holders 515 in the lower reflective region 120 and the upper reflective region 121 to align and hold the lighting element 104. The first raised lighting element holders 510 and the second raised lighting element holders 515 may be allow the lighting element 104 to be snapped into position. The lighting element 104 may be snapped into place or may slide into place. The first raised lighting element holders 510 and the second raised lighting element holders 515 may be integrally formed with the in-coupling structure 501. The first raised lighting element holders 510 and the second raised lighting element holders 515 may include reflective material. The in-coupling structure 501 may include indents 535 on the lower reflective region 120 and the upper reflective region 121 to align the LGP 101. The LGP 101 may be slid or inserted into the indents 535 and secured by friction. It should be noted that the first raised lighting element holders 510 and the second raised lighting element holders 515 and the indents 535 may be used alone or in combination with one another.

FIG. 5B illustrates an in-coupling structure 502 that is similar to the in-coupling structure 110, but may have grooves 530 in the lower reflective region 120 and the upper reflective region 121 to align and hold the lighting element 104. The grooves 530 may be allow the lighting element 104 to be snapped into position. The lighting element 104 may be snapped into place or may slide into place. The grooves 530 may be integrally formed with the in-coupling structure 502. The grooves 530 may include reflective material. The in-coupling structure 502 may include raised stoppers 520 on the lower reflective region 120 and the upper reflective region 121 to align the LGP 101. The raised stoppers 520 may be integrally formed with the in-coupling structure 501. The LGP 101 may be slid or inserted into the raised stoppers 520 and secured by friction. It should be noted that the grooves 530 and the raised stoppers 520 may be used alone or in combination with one another. The in-coupling structure may include any shape modification to align and hold the lighting element to the lighting device.

Figure 6:
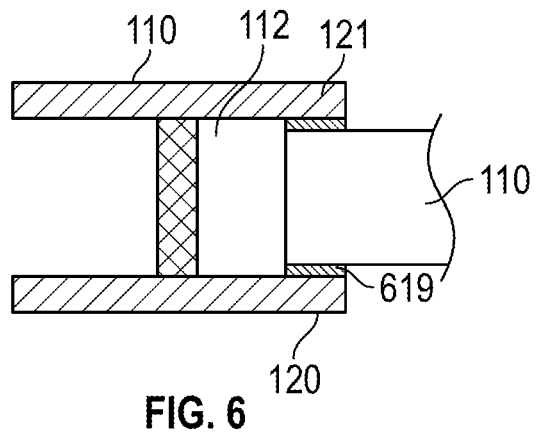
FIG. 6 is a cross-sectional view of the in-coupling structure joined to the LGP with an optional seal.

Referring now to FIG. 6, a cross-sectional view of the in-coupling structure 110 joined to the LGP 101 with an optional seal 619 is shown. The seal 619 may be formed on the lower reflective region 120 and the upper reflective region 121. The seal 619 may be formed at the ends of the in-coupling structure 110. The seal 619 may be located between the lower reflective region 120 and the upper reflective region 121 and the LGP 101 and may secure the LGP 101. The seal 619 may prevent moisture, dirt, and other contaminants from entering the second cavity 112. The seal 619 may be formed of, for example, silicone, and may be integrally formed with the in-coupling structure 110. Alternatively, the seal 619 may be a separate component formed on the in-coupling structure 110.

Figure 7A:
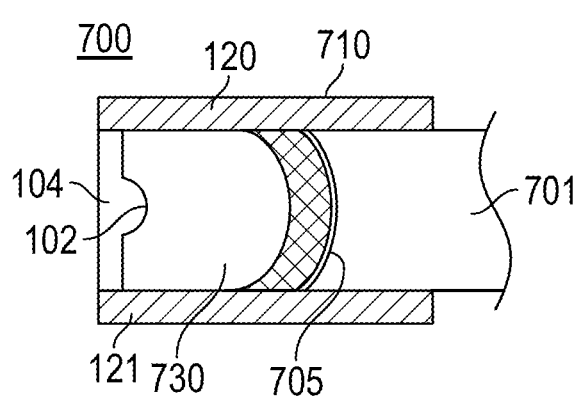
FIGS. 7A-7B are cross-sectional views of in-coupling structures with shaped phosphor regions.
Figure 7B:
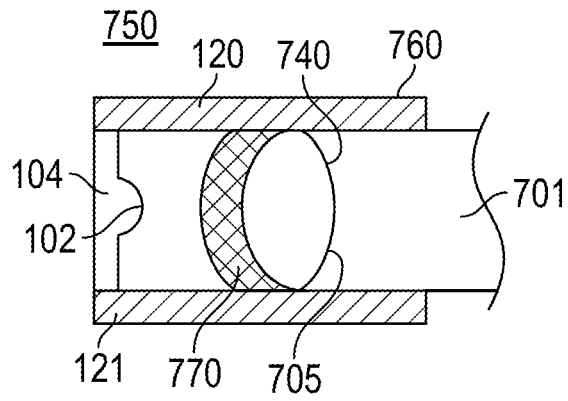

Referring now to FIGS. 7A and 7B, cross-sectional views of edge in-coupling structures with shaped phosphor regions are shown. FIG. 7A shows a lighting device 700 with a LGP 701 having a light in-coupling edge 705 that is shaped in a curved groove. The in-coupling edge 705 may be concave from the perspective of the LGP 701. An in-coupling structure 710 may be similar to the in-coupling structure 110, but may have a phosphor region 730 that is formed in a curve to complement the shape of the light in-coupling edge 705 of the LGP 701. The shape of the phosphor region 730 may limit reflection of light emitted from the LED 102 and passed through the phosphor region 730. The lighting device 700 is shown with a small air gap between the phosphor region 730 and the light in-coupling edge 705, but the phosphor region 730 and the light in-coupling edge 705 may be in contact. Alternatively, a large gap may be left between the phosphor region 730 and light in-coupling edge 705 to form a discernable second cavity.

FIG. 7B shows a lighting device 750 with the LGP 701 having the light in-coupling edge 705 that is shaped in a curved groove. The in-coupling edge 705 may be concave from the perspective of the LGP 701. An in-coupling structure 760 may be similar to the in-coupling structure 110, but may have a phosphor region 770 that is formed in a curve that is opposite in direction from the curve of the in-coupling edge 755. Thus, a second cavity 740 may be formed between the phosphor region 770 and the light in-coupling edge 755. In general, the phosphor region of an in-coupling structure may have any shape, including, for example a convex or concave shape, and may be combined with light guides having edges that are flat, curved, or have any other shape.

Figure 8:
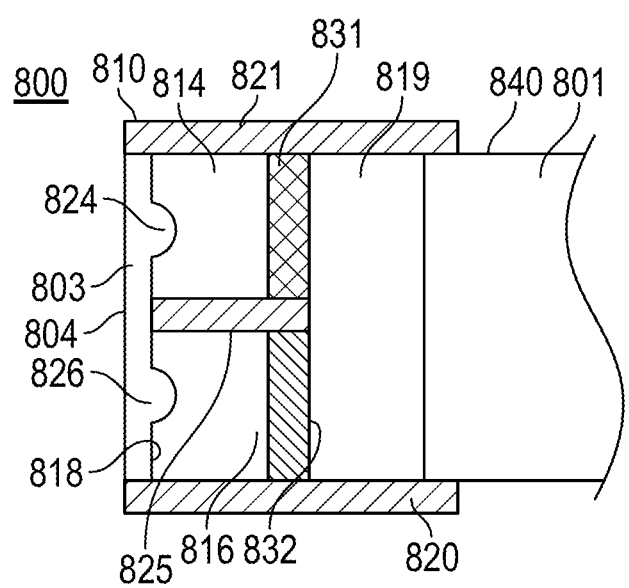
FIG. 8 is a cross-sectional view of a lighting device that includes a multiple phosphor in-coupling structure.

Referring now to FIG. 8, a cross-sectional view of a lighting device 800 that includes a multiple phosphor in-coupling structure 810 is shown. The lighting device 800 may include a LGP 801 and a lighting element 804. Multiple LEDs, such as a first LED 824 and a second LED 826 may be connected to a mount 803. The multiple phosphor in-coupling structure 810 may be positioned between the lighting element 804 and the light guide 801.

The multiple phosphor in-coupling structure 810 may include a lower reflective region 820 spaced apart from an upper reflective region 821. The multiple phosphor in-coupling structure 810 may include a first phosphor region 831 and a second phosphor region 832. The first phosphor region 831 and the second phosphor region 832 may be formed in a plane and may together connect the first phosphor region 831 and the second phosphor region 832. The first phosphor region 831 and the second phosphor region 832 may be perpendicular the first phosphor region 831 and the second phosphor region 832. The first phosphor region 831 and the second phosphor region 832 may be positioned between the lower reflective region 820 and the upper reflective region 821 such that sections of each of the lower reflective region 820 and the upper reflective region 821 extend beyond the edges of the first phosphor region 831 and the second phosphor region 832.

The multiple phosphor in-coupling structure 810 may further include a reflective partition 825. The reflective partition 825 may be positioned between the first phosphor region 831 and the second phosphor region 832. The reflective partition 825 may extend from a region between the first phosphor region 831 and the second phosphor region 832 to an upper surface 818 of a mount 803 of the lighting element 804. The reflective partition 825 may completely separate the first phosphor region 831 and the second phosphor region 832 or the first phosphor region 831 and the second phosphor region 832 may be partially or completely in contact with one another. The reflective partition 825 may separate the first LED 824 and the second LED 826.

The partition 825, the upper reflective region 821, the mount 903, and the first phosphor region 831 may form a first cavity 814. The first cavity 814 may surround the first LED 824. The upper reflective region 821, the first phosphor region 831, the second phosphor region 832, the lower reflective region 820, and the LGP 801 may form a second cavity 819. The partition 825, the lower reflective region 820, the mount 803, and the second phosphor region 832 may form a third cavity 816. The third cavity 816 may surround the second LED 826.

The first LED 824 and the second LED 826 may be any color, temperature, or intensity LEDs. The first phosphor region 831 and the second phosphor region 832 may be any composition that wavelength converts the light emanated from the first LED 824 and the second LED 826. In an example, the first LED 824 and the second LED 826 may be blue LEDs and the phosphor material used in first phosphor region 831 and the second phosphor region 832 may be a yellow phosphor, such as yttrium aluminum garnet (YAG). In other example, the first LED 824 and the second LED 826 may be blue LEDs and the phosphor material used in the first phosphor region 831 and the second phosphor region 832 may be a red phosphor.

The first LED 824 may emit light into the first cavity 814. The second LED 826 may emit light into the third cavity 816. The first LED 824 and the second LED 826 may be similar or may vary from one another by one or more characteristics such as, for example, type, color, intensity, and temperature. The first phosphor region 831 and the second phosphor region 832 may be similar or may vary from one another by one or more characteristics such as, for example, concentration, thickness, and composition.

The multiple phosphor in-coupling structure 810 may in-couple light emitted from the first LED 824 and the second LED 826 into the LGP 801. A portion of light emitted from the first LED 824 may directly enter the first phosphor region 831 through the first cavity 814. This light may be wavelength converted by the phosphor before exiting the first phosphor region 831 and entering the second cavity 819. Another portion of the light emitted from the first LED 824 may first reflect off of the upper reflective region 821 and/or the partition 825, both of which may prevent light leakage, before entering the first phosphor region 831. The light may be wavelength converted by the phosphor before exiting the first phosphor region 831 and entering the second cavity 819.

Similarly, a portion of light emitted from the second LED 826 may directly enter the second phosphor region 832 through the third cavity 816. This light may be wavelength converted by the phosphor before exiting the second phosphor region 832 and entering second cavity 819. Another portion of the light emitted from second LED 826 may first reflect off of the lower reflective region 820 and/or the partition 825, both of which may prevent light leakage, before entering the second phosphor region 832. The light may be wavelength converted by the phosphor before exiting the second phosphor region 832 and entering the second cavity 819.

Wavelength converted light exits the first phosphor region 831 and the second phosphor region 832 and may be in-coupled to the LGP 801 through the second cavity 819. The lower reflective region 820 and the upper reflective region 821 may prevent light leakage from the second cavity 819. The LGP 801 may propagate the light from the second cavity 819 toward an out-coupling surface 840.

The color of the light in-coupled to the LGP 801 from second cavity 819 may be controlled by controlling the first LED 824 and/or the second LED 826. For example, the first LED 824 and the second LED 826 may be blue light LEDs and the phosphor materials used in the first phosphor region 831 and the second phosphor region 832 may be different materials, such that different light color temperatures are provided to the second cavity 819. The phosphor material used in the first phosphor region 831 may produce a light from a LED that has a higher color temperature than that of the phosphor material used in the second phosphor region 832. The first LED 824 and the second LED 826 may be independently controlled (via separate traces on the mount). Thus, if the first LED 824 is emitting light and the second LED 826 is dark, the light emitted from the lighting device 800 may have a higher color temperature. If the first LED 824 is dark and the second LED 826 is emitting light, the light emitted may have a lower color temperature. If both the first LED 824 and the second LED 826 are emitting light, the light emitted may have a color temperature in between the two individual color temperatures.

The multiple phosphor in-coupling structure 810 may have the various shapes and configurations as described above for the edge in-coupling structure 110 and with respect to FIGS. 1-7B. The multiple phosphor in-coupling structure 810 may be made using the same methods and materials as described above for the edge in-coupling structure 110, and may be assembled as described above with respect to FIG. 4.

Figure 9:
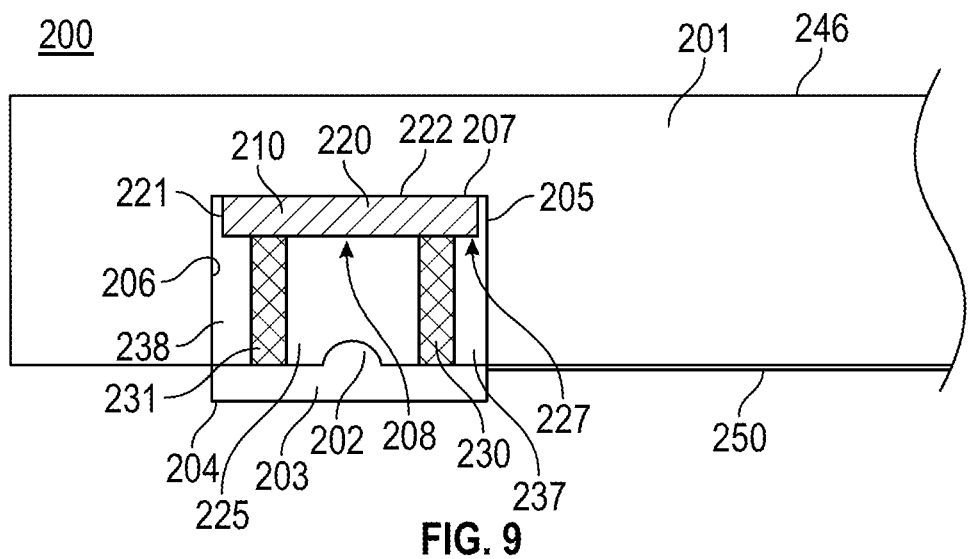
FIG. 9 is a cross-sectional view illustrating a lighting device that utilizes a direct-coupled technique for in-coupling light from a light emitting diode (LED) to a LGP.

Referring now to FIG. 9, a cross-sectional view illustrating a lighting device 200 that utilizes a direct-coupled technique for in-coupling light from a LED 202 to a LGP 201 is shown. The lighting device 200 may include the LGP 201 having a recess 205 and a lighting element 204. The lighting element 204 may include an LED 202 connected to a mount 203. Although not shown in FIG. 9, the lighting element 204 may include a plurality of LEDs 202. A recess in-coupling structure 210 may be positioned between the lighting element 204 and the LGP 201. The recess in-coupling structure 210 may in-couple light emitted from the LED 202 into the LGP 201.

The recess in-coupling structure 210 may include a reflective top region 220 and a first phosphor region 230 and second phosphor region 231 that extend down from the reflective top region 220 to the mount 203. The reflective top region 220, the first phosphor region 230, and the second phosphor region 231 enclose a first cavity 225 that houses the LED 202. The reflective top region 220 covers the first cavity 225. The reflective top region 220 may be shaped to fit within the recess 205. The recess 205 may be any shape, including rectangular, circular, oblong, and curved. The recess in-coupling structure 210 may have a shape similar to the shape of the recess 205.

The reflective top region 220 may have an edge 221 that contacts an inner wall 206 of the recess 205. The edge 221 may extend laterally past an outer edge of the first phosphor region 230 and an outer edge of the second phosphor region 231, both of which may not be in contact with the inner wall 206 of the recess. The edge 221 may be substantially flush with the outer edge of the first phosphor region 230 and the outer edge of the second phosphor region 231, and they all may be in contact with the inner wall 206 of the recess. A top surface 222 of the reflective top region 220 may contact an upper wall 207 of the recess 205. The top surface 222 may be separated from the upper wall 207 by a gap. It should be noted that the distance between the upper wall 207 of the recess 205 and an out-coupling surface 246 of the LGP 201 may vary.

In an example in which the reflective top region 220 extends laterally behind the first phosphor region 230 and the second phosphor region 231, the reflective top portion 220 may have a lip 227. The lip 227 of the reflective region 220, the first phosphor region 230, and the inner wall 206 of the recess 205 may form a second cavity 237. The lip 227 of the reflective region 220, the second phosphor region 230, and the inner wall 206 of the recess 205 may form a third cavity 238.

The reflective top region 220, the first phosphor region 230, and the second phosphor region 231 may be integrally formed so that the recess in-coupling structure 210 is a single piece. The reflective top region 220 may improve the in-coupling efficiency by preventing any light waste or leakage around the lighting element 204 and may reflect light emitted from the LED 202 into the first phosphor region 230 and the second phosphor region 231. The first phosphor region 230 and the second phosphor region 231 may not be parallel to each other. The reflective top region 220, the first phosphor region 230, and the second phosphor region 231 may have any number of different shapes. For example, the first phosphor region 230 and the second phosphor region 231 may form an angled or triangular shape. In another example, the first phosphor region 230 and the second phosphor region 231 may be curved. In yet another example, the reflective top region 220 may have an overall curve or may be composed of two curved sections meeting in the middle of the reflective top region 220.

The recess in-coupling structure 210 may be made of a transparent material such as silicone, PC, PMMA, PE, or another type of acrylic and/or plastic. The recess in-coupling structure 210 may be rigid or flexible. The recess in-coupling structure 210 may be formed by any method used to form solid structures in plastics, such as extrusion methods, injection molding methods, or compression molding methods. The first phosphor region 230 and the second phosphor region 231 may be formed by any method use to incorporate materials into plastic. In an example, phosphor powder may be injected into softened silicone during extrusion or molding to form the first phosphor region 230 and the second phosphor region 231. first phosphor region 230 and the second phosphor region 231 may have a uniform composition, or may have a varied composition of phosphor along their length. In an example in which the more than one LED 102 is used, the composition of the first phosphor region 230 and the second phosphor region 231 may vary between one or more LEDs 102. The first phosphor region 230 and the second phosphor region 231 may have similar or different compositions.

Similarly, white or reflective powder, such as $TiO_2$, may be injected into the softened silicone to form the reflective top region 220. In another example, different silicone mixtures containing the phosphor and/or the reflective material for the first phosphor region 230, the second phosphor region 231, and the reflective top region 220 may be combined during an extrusion or molding process. In another example, the phosphor and/or the reflective material may be coated onto the surface of the first phosphor region 230, the second phosphor region 231, and the reflective top region 220 after the structure is formed of the transparent base material. This may be done, for instance, by spray coating using a mask or by a lamination process.

The lighting element 204 may include the LED 202 connected to the mount 203. The mount 203 may provide an electrical connection to the LED 202 and may be, for example, a rigid PCB or a flexible tape. The lighting element 204 is position underneath the LGP 201 so that the LED 202 is positioned within the first cavity 225. The LED 202 may face the reflective top region 220 and may be separated from the reflective top region 220 by the first cavity 225. The LED 202 may be separated from the first phosphor region 230 and the second phosphor region 231 by the first cavity 225. The mount 203 may include reflective material on the surface on which LED 202 is attached to reflect light emitted by the LED 202. The mount 203 may include a heatsink function on its lower surface opposite to surface on which LED 202 is attached to conduct and transfer the heat generated by the lighting element 204.

The LGP 201 may be rectangular, circular, or have another shape, and may include one or more recesses 205. The recess 205 may be formed using a mold when the LGP 201 is formed. The recess 205 may be formed by drilling the LGP 201 after it is formed. The LGP 201 may be made of a transparent material such as silicone, PC, PMMA, PE, or another type of acrylic and/or plastic. The LGP 201 may be rigid or flexible. The LGP 201 may include various features, such as light extraction features (e.g., roughening, prisms, ink dots, etc.) that are known in the art. The LGP 201 may also include, for example, a bottom reflecting sheet 250 to reflect light towards the out-coupling surface 246 to out-couple the light through throughout the length of the LGP 201. The LGP 201 may be used as a backlight in any size and type of device, such as a smartphone, a tablet, a TV, or may be used in illumination applications such as troffers, downlights, high bays, and linear lighting structures.

The LED 202 may be any color, temperature, or intensity LED. The first phosphor region 230 and the second phosphor region 231 may be any composition that wavelength converts the light emanated from the LED 202. In an example, the LED 202 may be a blue LED and the phosphor material used in the first phosphor region 230 and the second phosphor region 231 may be a yellow phosphor, such as yttrium aluminum garnet (YAG). In other example, the LED 202 may be a blue LED and the phosphor material used the first phosphor region 230 and the second phosphor region 231 may be a red phosphor.

In operation, the recess in-coupling structure 210 may in-couple light emitted from the LED 202 into the LGP 201. Light may be emitted from the LED 202 into the first cavity 225. A portion of the light emitted from LED 202 may directly enter the first phosphor region 230 or the second phosphor region 231 of the recess in-coupling structure 210 through the first cavity 225. This light may be wavelength converted by the phosphor before exiting the first phosphor region 230 and the second phosphor region 231. The wavelength converted light may enter the second cavity 237 and the third cavity 238. Another portion of the light emitted from LED 202 may first reflect off of a lower surface 208 of the reflective top region 220 before entering the first phosphor region 230 or the second phosphor region 231 through the first cavity 225. This light may be wavelength converted by the phosphor before entering the second cavity 237 or third cavity 238.

The wavelength converted light may exit the first phosphor region 230 and the second phosphor region 231 and may be in-coupled to the LGP 201 through the inner wall 206 of the recess 205. The lip 227 of the recess in-coupling structure 210 may prevent light leakage from the second cavity 237 and the third cavity 238. The LGP 201 may propagate the light from the second cavity 237 and the third cavity 238 toward the out-coupling surface 246. In an example, the LED 202 may be a blue LED and the phosphor material used in the first phosphor region 230 and/or the second phosphor region 231 may be a yellow phosphor. The blue light emitted from the LED 202 into the first cavity 225 may be converted to another wavelength by the first phosphor region 230 and/or the second phosphor region 231. The light may enter the second cavity 237 and/or the third cavity 238 and may be in-coupled into the LGP 201.

Figure 10:
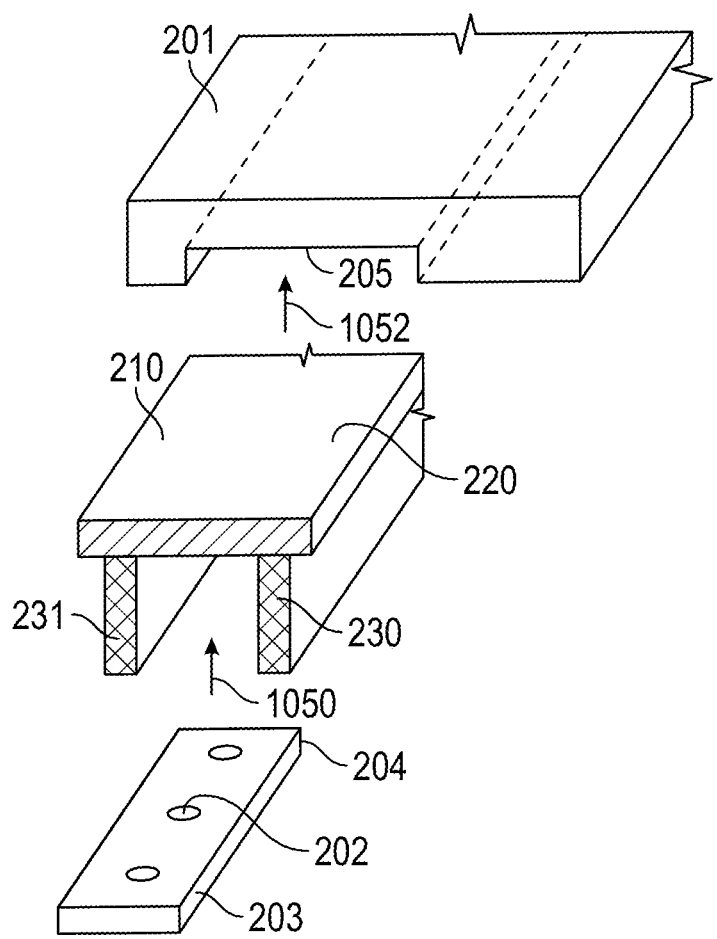
FIG. 10 is a perspective view of component parts of the lighting device and method of assembly of the lighting device.

Referring now to FIG. 10, a perspective view of component parts of the lighting device 200 and method of assembly of the lighting device 200 is shown. As described above, the LGP 201 may include the recess 205. The recess 205 may be elongated to from a groove through the LGP 201. The recess in-coupling structure 210 may be shaped in an elongated structure to fit within the recess 205. The recess in-coupling structure 210 may include a reflective top region 220 and the first phosphor region 230 and the second phosphor region 231 that extend from the reflective top region 220 on each side. The reflective top region 220, the first phosphor region 230, and the second phosphor regions 231 may be integrally formed.

The lighting element 204 may include the one or more LEDs 202. The one or more LEDs 202 may be linearly arranged on the mount 203. The LGP 201, the recess in-coupling structure 210, and the lighting element 204 may be pre-formed before assembly of the lighting device 200. The lighting element 204 may be slid or inserted 1050 into the ends of the first phosphor region 230 and the second phosphor region 231. The recess in-coupling structure 210 may include any shape modification to align and hold the lighting element 204, such as those described above with reference to FIGS. 4-6. The recess in-coupling structure 210 may be slid or inserted 1052 into the recess 205 of the LGP 201.

Because of the recess in-coupling structure 210, assembly of lighting device 200 may be more efficient and more uniform than conventional direct-coupled lighting devices. Additionally, because of the ease of assembly, making lighting devices that have different color rendering indices and/or correlated color temperatures may be relatively easy. The same blue LEDs may be used for all lighting devices. Different recess in-coupling structures prepared with different phosphors in the phosphor region can be used to easily change the color temperature or color rendering index of the light emitted from the lighting device.

Figure 11A:
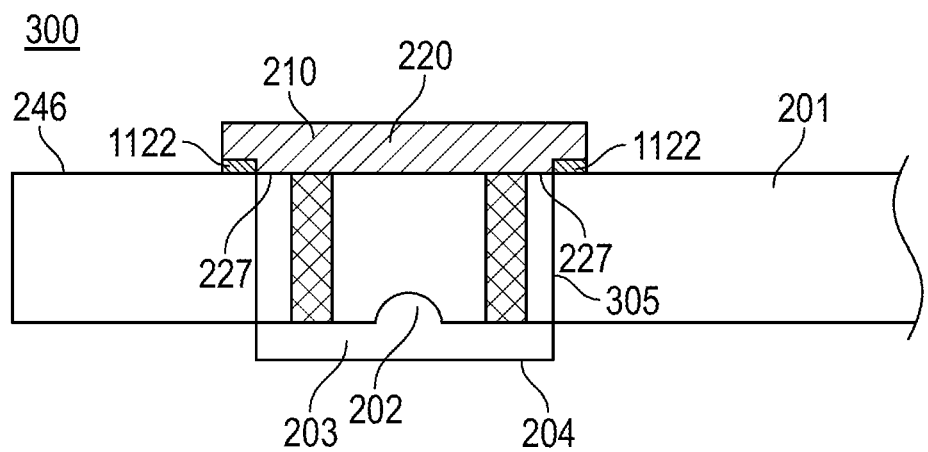
FIGS. 11A-11C are cross-sectional views of different examples of a lighting device.
Figure 11B:
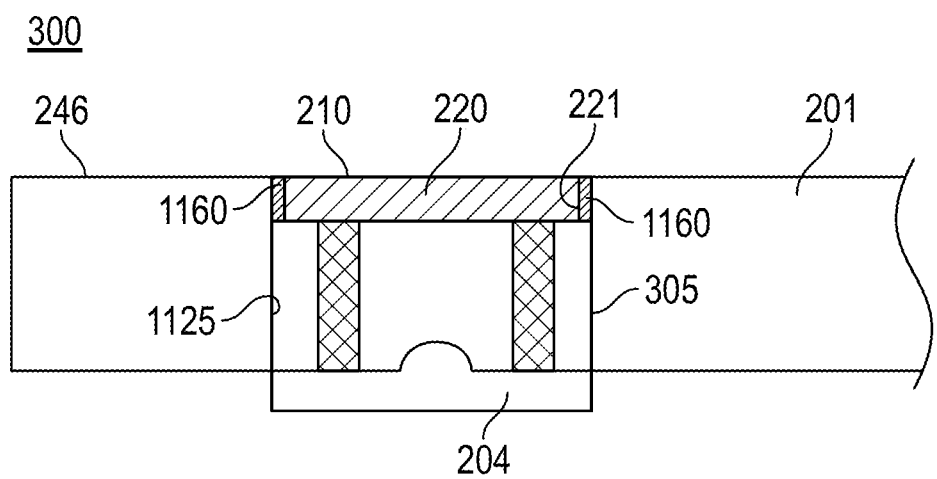
Figure 11C:
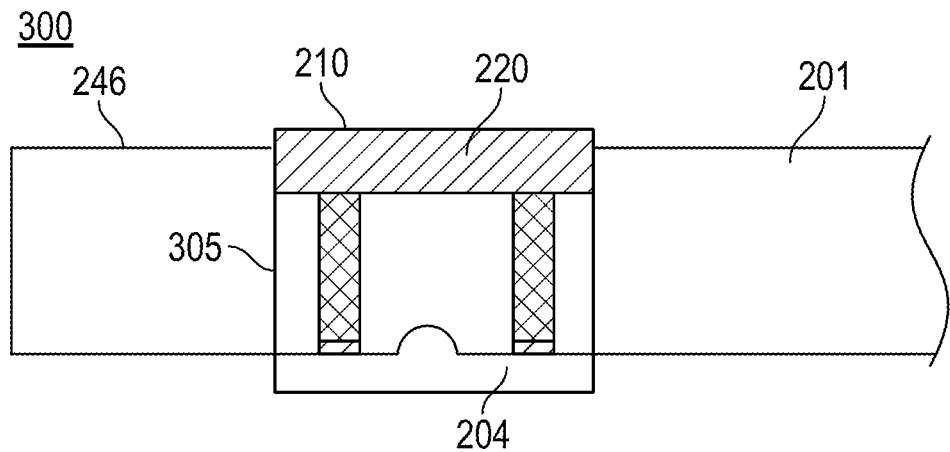

Referring now to FIGS. 11A-11C, cross-sectional views of different examples of a lighting device 300 are shown. The lighting device 300 may be similar to the lighting device 200 as described above with reference to FIGS. 9-10. However, the lighting device 300 may be formed in a recess 305 that extends through the entire thickness of the LGP 201. The reflective top region 220 of the recess in-coupling structure 210 may optionally include a seal 1122 on the lip 227 of the in-coupling structure 110. The seal 1122 may be positioned between the lip 227 and the out-coupling surface 246 of the LGP 201. The seal 1122 may prevent moisture, dirt, and other contaminants from entering the recess 305 and may secure the recess in-coupling structure 210 to the LGP 201. The seal 1122 may be formed of, for example, silicone, and may be integrally formed with the recess in-coupling structure 210. Alternatively, the seal 1122 may be a separate component formed on the in-coupling structure 210 and/or the LGP 201. In the lighting device 300 in FIG. 11A, the reflective top region 220 may be positioned above the out-coupling surface 246 of the light guide 1501.

However, as shown in FIG. 11B, the recess in-coupling structure 210 may be positioned so that a top surface of the reflective top region 220 is even with the out-coupling surface 246 of the LGP. FIG. 11B also shows an optional seal 1160 at the outer edge 221 of the reflective top region 220. The seal 1160 may be positioned between the edge 221 and an inner wall 1125 of the recess 305. The seal 1160 may prevent moisture, dirt, and other contaminants from entering the recess 305 and may secure the recess in-coupling structure 210 to the LGP 201. The seal 1160 may be formed of, for example, silicone, and may be integrally formed with the recess in-coupling structure 210. Alternatively, the seal 1160 may be a separate component formed on the recess in-coupling structure 210 and/or the LGP 201. As shown in FIG. 11C, an upper surface of the recess in-coupling structure 210 may be substantially flush with the out-coupling surface 246 of the LGP 201.

FIG. 11C shows an example in which the recess in-coupling structure 210 may be partially inserted into the recess 305, so that an upper part of the reflective top region 220 is above the out-coupling surface 246 of the LGP 201 and a lower part is within the recess 305. The recess in-coupling structure 210 may be held in the recess 305 by friction. The recess in-coupling structure 210 shown in FIG. 11C may not include a seal, but may, alternatively, include a seal as described above.

Figure 12:
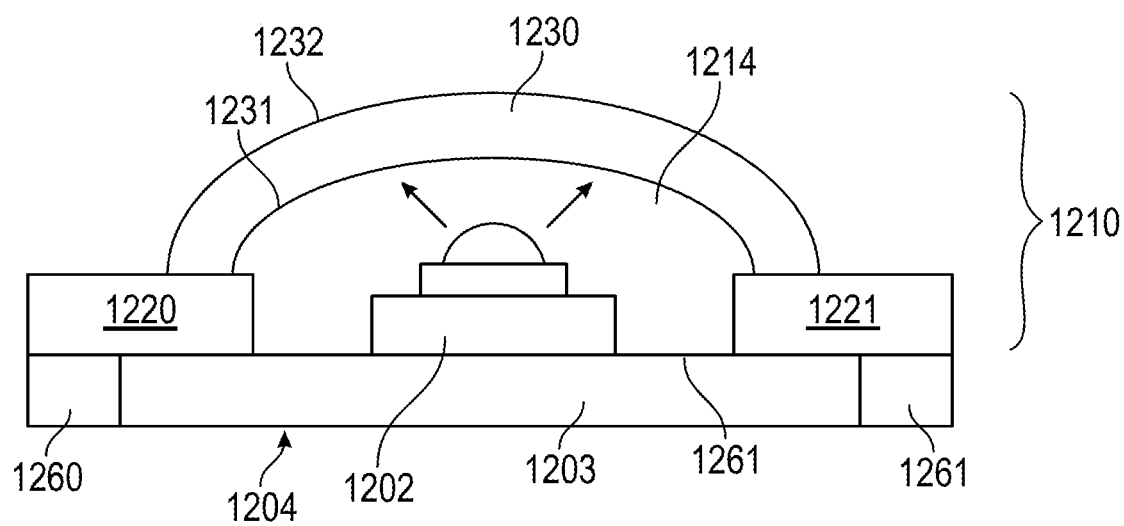
FIG. 12 is a cross-sectional view of a lighting device with a remote phosphor cover.

Referring now to FIG. 12, a cross-sectional view of a lighting device 1200 with a remote phosphor cover 1230 is shown. The lighting device 1200 may include a lighting element 1204, a first reflective region 1220, a second reflective region 1221, and a remote phosphor cover 1230. The lighting element 1204 may include a LED 1202 that is connected to a mount 1203. The LED 1202 may include a LED die directly mounted on the mount 1203. Although not shown, the LED 1202 may also include a small submount between the LED die and the mount. The mount 1203 may provide electrical connection to the LED 1202. The mount 1203 may be, for example, a rigid printed circuit board (PCB) or a flexible tape. Although not shown, the mount 1203 may connect one or more strings of LEDs in series and/or parallel.

The first reflective region 1220 may be spaced apart from the second reflective region 1221. The first reflective region 1220 may be substantially parallel to the second reflective region 1221. The remote phosphor cover 1230 may connect the first reflective region 1220 and the second reflective region 1221. The remote phosphor cover 1230 may extend above the first reflective region 1220 and the second reflective region 1221 forming a cavity 1214. The remote phosphor cover 1230 may resemble a dome over the LED 1202, but may have any shape, such as rectangular with linear sides and a top. In an example, remote phosphor cover 1230 may have an inner edge that is substantially flush with an inner edge of the first reflective region 1220 and an inner edge of the second reflective region 1221. In another example, the inner edge of the first reflective region 1220 and the inner edge of the second reflective region 1221 may extend into the cavity 1214 further than the inner edge of the remote phosphor cover 1230. The remote phosphor cover 1230, the first reflective region 1220, and the second reflective region 1221 may be integrally formed so that they form a single remote phosphor structure 1210.

Light may be emitted from the LED 1202 into the cavity 1214. The mount 103 may include reflective material on its upper surface 1218 to reflect light emitted by the LED 102 towards the remote phosphor cover 1230, the first reflective region 1220, and the second reflective region 1221. A portion of the light emitted from the LED 1202 may directly enter a first side 1231 of remote phosphor cover 1230 through the cavity 1214. The light may be wavelength converted by the phosphor in the remote phosphor cover 1230 before exiting through a second side 1232 of the remote phosphor cover 1230 and dissipating outward. Another portion of the light emitted from LED 1202 may first reflect off of an inner side of the first reflective region 1220 and/or an inner side of the second reflective region 1221 in the cavity 1214 and then enter the first side 1231 of remote phosphor cover 1230. The light may be wavelength converted by the phosphor in the remote phosphor cover 1230 before exiting through the second side 1232.

The remote phosphor structure 1210 may be made of a transparent material such as silicone, PC, PMMA, PE, or another type of acrylic and/or plastic. The remote phosphor structure 1210 may be rigid or flexible. The remote phosphor structure 1210 may be formed by any method used to form solid structures in plastics, such as extrusion methods, injection molding methods, or compression molding methods. The remote phosphor cover 1230 may be formed by any method use to incorporate materials into plastic. In an example, phosphor powder may be injected into softened silicone during extrusion or molding to form the remote phosphor cover 1230. The remote phosphor cover 1230 may have a uniform composition, or may have a varied composition of phosphor along its length. In an example in which the more than one LED 1202 is used, the composition of the remote phosphor cover 1230 may vary between one or more LEDs 1202.

Similarly, white or reflective powder, such as $TiO_2$, may be injected into the softened silicone to form the first reflective region 1220 and the second reflective region 1221. In another example, different silicone mixtures containing the phosphor and/or the reflective material for the remote phosphor cover 1230, the first reflective region 1220, and the second reflective region 1221 may be combined during an extrusion or molding process. In another example, the phosphor and/or the reflective material may be coated onto the surface of the remote phosphor cover 1230, the first reflective region 1220, and the second reflective region 1221 after the structure is formed of the transparent base material. This may be done, for instance, by spray coating using a mask or by a lamination process.

The lighting element 1204 may be joined to the remote phosphor structure 1210 by an optional first seal 1260 and second seal 1261. The first seal 1260 may be in contact with an outer edge of the mount 1203 and a lower edge of the first reflective region 1220. The second seal 1261 may be in contact with an outer edge of the mount 1203 and a lower edge of the second reflective region 1221. The first seal 1260 and the second seal 1261 may prevent moisture, dirt, and other contaminants from entering the cavity 1214 and may secure the lighting element 1204 to the remote phosphor structure 1210. The first seal 1260 and the second seal 1261 may be formed of, for example, silicone, and may be integrally formed with the remote phosphor structure 1210. Alternatively, the first seal 1260 and the second seal 1261 may be a separate component formed on the remote phosphor structure 1210 and/or the mount 1203.

Figure 13:
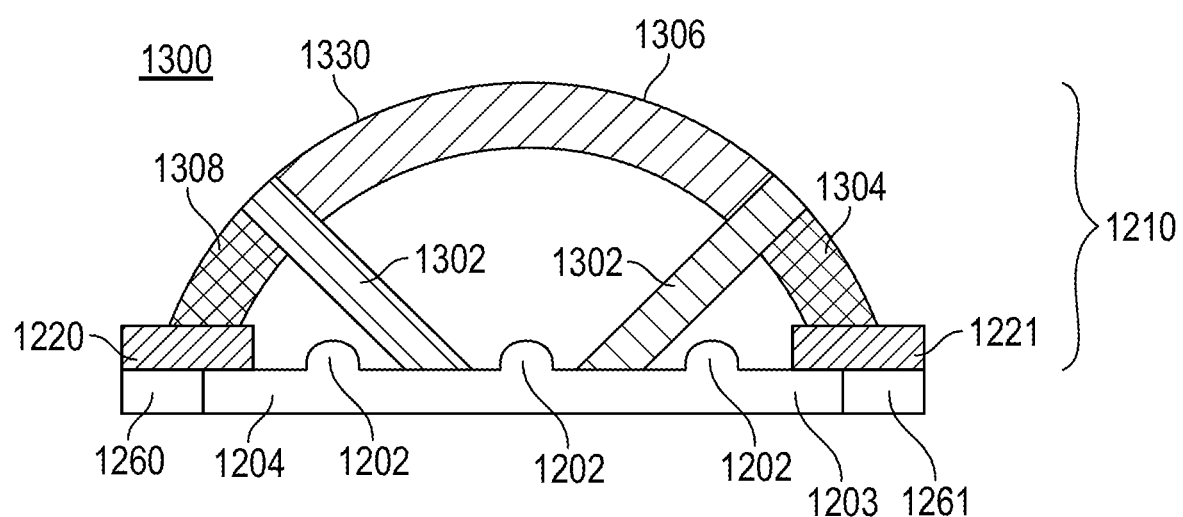
FIG. 13 is a cross-sectional view of a lighting device with a segmented remote phosphor cover.

Referring now to FIG. 13, a cross-sectional view of a lighting device 1300 with a segmented remote phosphor cover 1330 is shown. The lighting device 1300 may be similar to the lighting device 1200 as described above with reference to FIG. 12. However, as shown in FIG. 13, the lighting device 1300 may have multiple LEDs 1202 which may be separated by reflective walls 1302. The reflective walls 1302 may have a similar composition as the first reflective region 1220 and the second reflective region 1221. The reflective walls 1302 may extend from the segmented remote phosphor cover 1330 to the mount 1203 and may form individual cavities around each individual LED 1202, thereby isolating one LED 1202 from another. The individual LEDs 1202 may be similar or may vary from one another by one or more characteristics such as, for example, type, color, intensity, and temperature. A first phosphor region 1308, a second phosphor region 1306, and a third phosphor region 1304 may be separated by the reflective walls 1302. The first phosphor region 1308, the second phosphor region 1306, and the third phosphor region 1304 may be similar or may vary from one another by one or more characteristics such as, for example, concentration, thickness, and composition. The different phosphor regions in the segmented remote phosphor cover 1330 along with the different LEDs 1202 can be used to easily change the color temperature or color rendering index of the light emitted from the lighting device 1300.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A coupling structure for coupling one or more light emitting diodes (LEDs) and a light guide plate (LGP), the coupling structure comprising:
    a first reflective surface;
    a second reflective surface facing and spaced apart from the first reflective surface;
    a phosphor structure extending between and joining the first reflective surface and the second reflective surface;
    a first open-ended cavity located on one side of the phosphor structure and defined by a portion of the first reflective surface, portion of the second reflective surface, and the phosphor structure and adapted to attach to an edge of the LGP; and
    a second open-ended cavity located on an opposite side of the phosphor structure from the first open-ended cavity, defined by a portion of the first reflective surface, portion of the second reflective surface, and the phosphor structure and adapted to attach to the one or more LEDs with the one or more LEDs spaced apart from the phosphor structure;
    the first reflective surface, the second reflective surface, and the phosphor structure forming a structure attachable to and detachable from the LGP and the one or more LEDs as a single piece, the first reflective surface, the second reflective surface, and the phosphor structure are a portion of or disposed on a single silicone or plastic piece.

2. The coupling structure of claim 1, wherein the phosphor structure has a curved surface.

3. The coupling structure of claim 1, wherein the first reflective surface or second reflective surface is curved.

4. The coupling structure of claim 1, further comprising a seal disposed on the first and second reflective surfaces.

5. The coupling structure of claim 4, wherein the first reflective surface, the second reflective surface, the phosphor structure, and the seal form a structure attachable to and detachable from the LGP and the one or more LEDs as a single piece.

6. The coupling structure of claim 5, wherein the first reflective surface, the second reflective surface, the phosphor structure, and the seal are a portion of or disposed on a single silicone or plastic piece.

7. A light emitting device comprising:
    the coupling structure of claim 4;
    a light guide plate (LGP) attached to the first open-ended cavity of the coupling structure; and
    one or more LEDs attached to the second open-ended cavity of the coupling structure.

8. The light emitting device of claim 7, wherein the seal secures the LGP to the first open-ended cavity of the coupling structure.

9. The coupling structure of claim 1, further comprising one or more tabs disposed on the first or second reflective surface to secure the one or more LEDs.

10. The coupling structure of claim 1, further comprising one or more grooves in the first or second reflective surfaces to secure the one or more LEDs.

11. A light emitting device comprising:
    the coupling structure of claim 1;
    a light guide plate (LGP) attached to the first open-ended cavity of the coupling structure; and
    one or more LEDs attached to the second open-ended cavity of the coupling structure.

12. The coupling structure of claim 1, wherein the coupling structure is flexible.

13. The coupling structure of claim 1, wherein the coupling structure is rigid.

14. The coupling structure of claim 1, wherein the first reflective surface and the second reflective surface comprise light scattering particles embedded in the silicone or plastic piece.

15. The coupling structure of claim 1, wherein the first reflective surface and the second reflective surface comprise reflective coatings disposed on the silicone or plastic piece.

16. The coupling structure of claim 1, wherein the phosphor structure comprises phosphor particles embedded in the silicone or plastic piece.

17. The coupling structure of claim 1, wherein the phosphor structure comprises phosphor coated onto the silicone or plastic piece.

18. The coupling structure of claim 1, wherein the first open-ended cavity is adapted to attach to an edge of the light guide plate with the edge of light guide plate spaced apart from the phosphor structure.

* * * * *